United States Patent

Kemper et al.

[11] Patent Number: 5,486,985
[45] Date of Patent: Jan. 23, 1996

[54] ADJUSTING APPARATUS FOR HEADLIGHT REFLECTOR

[75] Inventors: Wolfgang Kemper, Rüthen; Heiko Briese, Lippstadt, both of Germany

[73] Assignee: Hella KG Hueck & Co., Lippstadt, Germany

[21] Appl. No.: 354,784

[22] Filed: Dec. 12, 1994

[30] Foreign Application Priority Data

Dec. 16, 1993 [DE] Germany .......................... 43 42 881.9

[51] Int. Cl.$^6$ ................................................. B60Q 1/06
[52] U.S. Cl. ...................... 362/69; 362/282; 362/322
[58] Field of Search ........................... 362/61, 66, 69, 362/70, 279, 282, 322

[56] References Cited

U.S. PATENT DOCUMENTS

| | | |
|---|---|---|
| 4,802,067 | 1/1989 | Ryder et al. ............................ 362/61 |
| 4,980,804 | 12/1990 | Dobler ................................ 362/69 |
| 5,386,349 | 1/1995 | Wheat et al. ......................... 362/61 |

FOREIGN PATENT DOCUMENTS

3525618A1   1/1987   Germany .

*Primary Examiner*—Ira S. Lazarus
*Assistant Examiner*—Sara Sachie Raab
*Attorney, Agent, or Firm*—Griffin, Butler, Whisenhunt & Kurtossy

[57] ABSTRACT

An adjusting apparatus for one or more headlight reflectors (1) has first and second miter gear mechanisms (4, 12), each of which includes a toothed-gear pair. The reflector can be pivoted about an axis by a rotation device, or knob, on the exterior of the housing. The two miter gear mechanisms are coupled by means of a rigid shaft (13) which is positioned in a bearing box (9) formed in a housing rearward wall (7). The shaft carries at each of its free ends a shaft toothed-gear of the respective first and second miter gear mechanisms and is held radially in the bearing box by means of girding elements of the toothed-gears (5, 15) whose teeth engage with the teeth of the shaft toothed-gears.

20 Claims, 3 Drawing Sheets

ADJUSTING APPARATUS FOR HEADLIGHT REFLECTOR

BACKGROUND OF THE INVENTION

This invention concerns an adjusting apparatus for one or more reflectors of a motor vehicle headlight with which a reflector, which is enclosed in an interior of a headlight housing by a light-transmissive shield, can be pivoted about an axis, there being two angled transmission units coupled to one another in the interior of the housing, the first angled transmission unit comprising a first miter gear mechanism having a toothed-gear pair with a pin toothed-gear thereof being coupled to, and rotatable with, an adjusting pin which couples the reflector with a rearward housing wall, and with a shaft toothed-gear thereof being positioned between the pin toothed-gear and a bearing box of the rearward housing wall, and a second angled transmission unit, at a remote end of the first miter gear mechanism, being rotatably mounted in an opening of the housing and having a rotatable knob thereon, manipulatable from an exterior of the housing.

Such an adjusting apparatus for a motor vehicle headlight reflector is disclosed in German patent DE 35 25 618 A 1. The angled transmission unit which is coupled to the first miter gear mechanism has a flexible shaft which is shoved onto an irregularly-cross-sectioned pin at the first miter gear mechanism and is thereby rotatable coupled with a shaft toothed-gear whose teeth interengage with teeth of a pin toothed-gear of an adjusting pin, and which, with the adjusting pin, is held radially and axially in a bearing box of a housing rearward wall by a cover which serves as an attachment device. In this regard, the adjusting pin extends through an opening in the cover and an end portion thereof which extends toward the rearward housing wall engages with a shell-like rim formed on the housing wall. A bearing in the housing rearward wall for the shaft toothed-gear of the first miter gear mechanism, which is coupled to the flexible shaft to be rotatable therewith, is a peripheral ring groove in the housing wall and the cover in which a ring collar of each of the shaft toothed-gear and the adjacent flexible shaft respectively engage. With such a bearing arrangement for the flexible shaft, and with the toothed-gear's coupling therewith to be rotatable therewith, the ring collars of the flexible shaft and the shaft toothed-gear, and the ring groove for receiving them, must be dimensioned so as to exactly fit together so that the ring collar of the flexible shaft is not restricted from movement by too little play nor that the shaft toothed-gear, which is coupled to it, is allowed too great a position deviation to the adjacent pin toothed-gear with too much play. Upon mounting the cover, which covers both of the toothed-gears of the first miter gear mechanism, one must be particularly careful that the portion of the ring groove formed by the cover and the portion of the ring groove formed by the housing fit exactly together. The rotation axis of the shaft tooth gear of the first miter gear mechanism with which the flexible shaft is coupled for rotation, extends horizontally and almost parallel to the rearward housing wall while the rotation axis of a rotation knob mechanism, which is rotatably mounted in an opening of the housing, extends almost parallel to the adjusting pin of the first miter gear mechanism. The flexible shaft defines, between the knob mechanism and the first miter gear mechanism, a large bow so that there is no danger of the flexible shaft becoming kinked. However, because of this the flexible shaft extends quite far into the interior of the housing and can, therefore, only be used with a particular space availability in the interior of the headlight. The flexible shaft is shoved onto an irregularly-shaped end portion of a pin at the knob mechanism whose other end supports the knob and which is rotatably mounted in an opening of the housing between both end portions. Mounting the flexible shaft is inconvenient during mass production and is time consuming, and further the flexible shaft is cost intensive to manufacture and its attachment with the pin carrying the knob, relative to a release thereof, is not certain. Upon adjusting the reflector via both of the angled transmission units it is further disadvantageous that, because of the flexibility of the shaft, a hysteresis is created by means of which the reflector could be jerked to a misadjustment. Jerked misadjustments lead to, during mass production, in inexact adjustment of the reflector.

It is an object of this invention to provide an adjusting apparatus for one or more headlight reflectors of the type described in the opening paragraph above in which the first and second angled transmission units, which are coupled to one another, extend into an interior of a housing as little as possible and which comprises as few parts as possible which are as easy to mount as possible. Further, it is an object of this invention to provide such an adjusting apparatus in which both angled transmission units can be cost effectively manufactured and function extremely reliably.

SUMMARY OF THE INVENTION

According to principles of this invention, in an adjusting apparatus of the type described in the opening paragraph above, the angled transmission unit which is coupled with the first miter gear mechanism comprises a toothed-gear pair, a rotation-part toothed-gear and a shaft toothed-gear, forming a second miter gear mechanism. The adjusting apparatus further includes a rigidly manufactured shaft. A first free end of the shaft is coupled to the shaft toothed-gear of the first miter gear mechanism for rotation therewith and the opposite free end of the shaft is coupled to the rotation-part toothed-gear of the second miter gear mechanism for rotation therewith. The shaft extends along an interior side of a rearward housing wall. At least the end of the shaft with the shaft toothed-gears are in a trough-like bearing box set in the rearward housing wall. The shaft is radially held in the trough-like bearing box by a covering element for the pin and rotation-part toothed-gears whose teeth interengage with the shaft toothed-gears which rotate with the shaft.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a rear view of a housing of a motor vehicle headlight with an adjusting apparatus of this invention in which a reflector mounted in a housing thereof has two angled transmission unit;

DESCRIPTION OF THE PREFERRED EMBODIMENT

Figure 2:
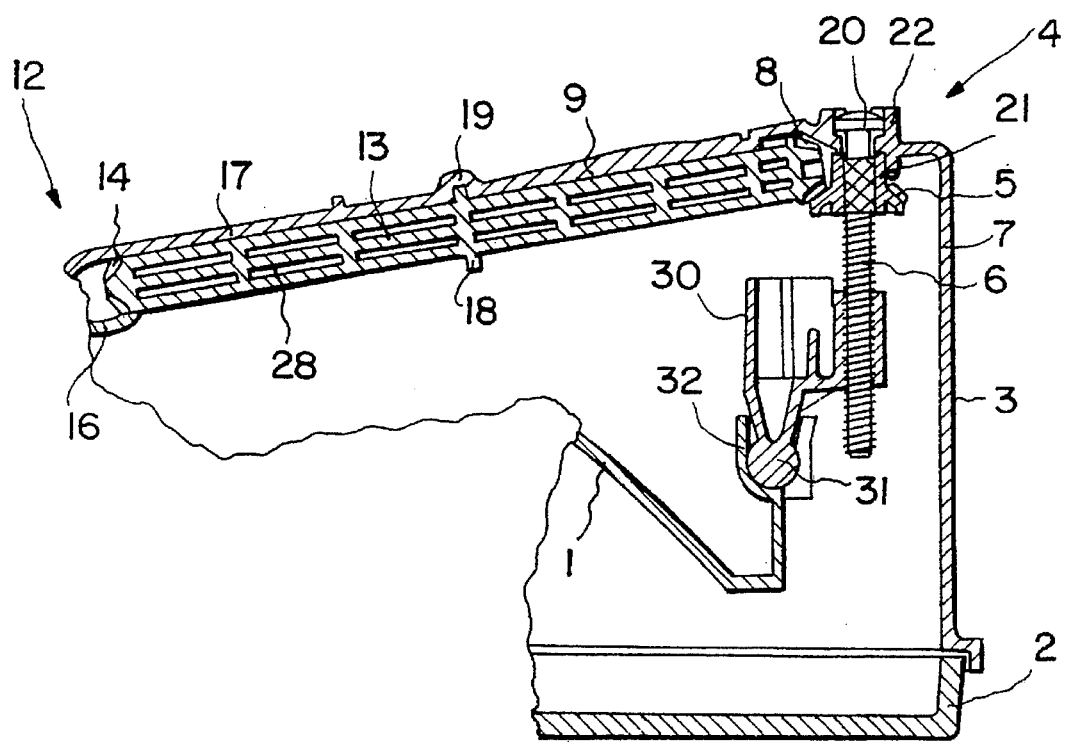
FIG. 2 is a cross-section taken on line II—II in FIG. 1 passing through one of the angled transmission units (in a first embodiment)
Figure 3:
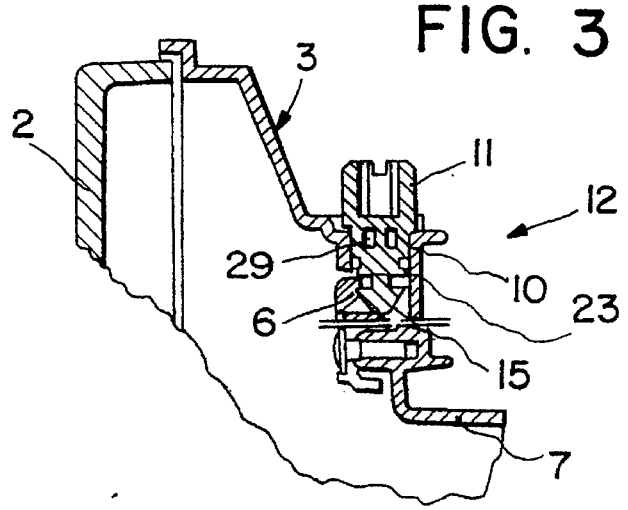
FIG. 3 is a cross-sectional view taken on line III—III in FIG. 1.
Figure 2:
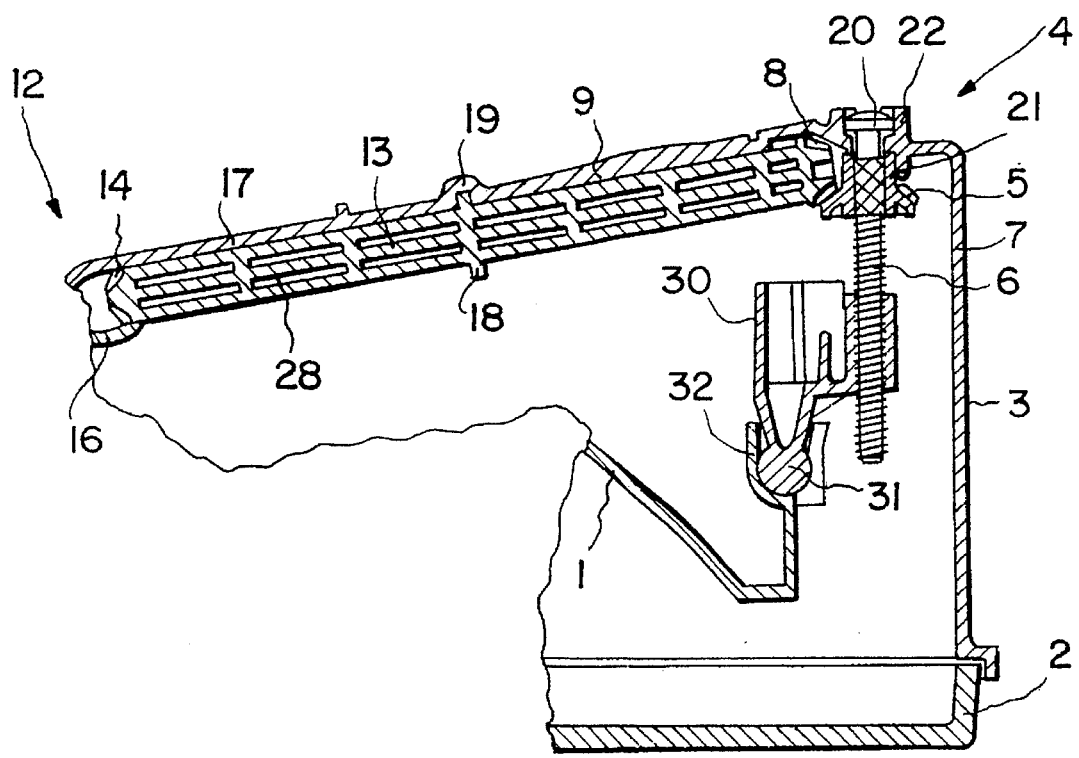
Figure 3:
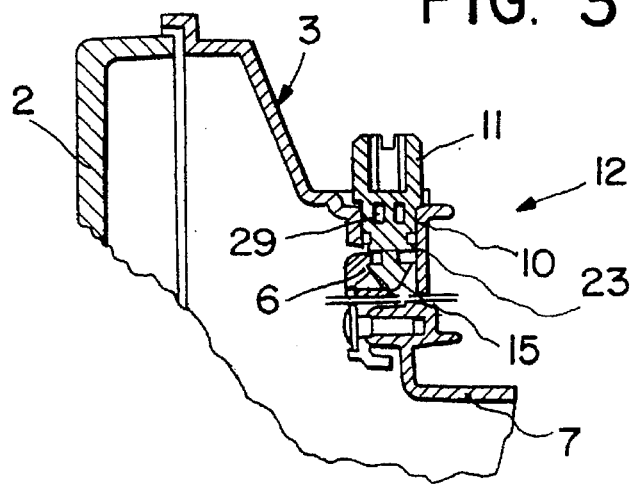
Figure 4:
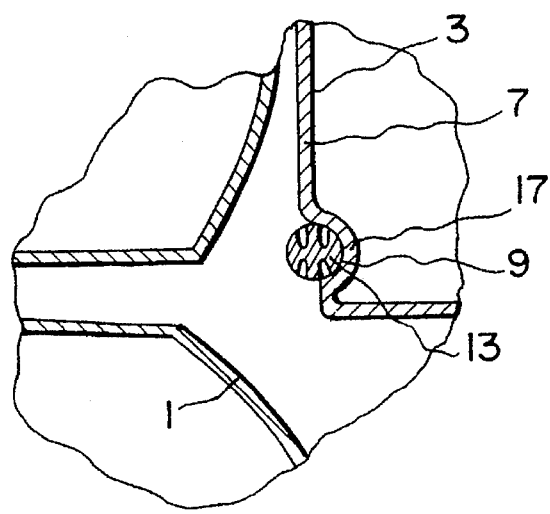
FIG. 4 is a cross-section taken on line IV—IV in FIG. 1.

The headlight of FIGS. 1 through 4 has a resinous-plastic pot-shaped housing 3, a light-transmissive shield 2 for enclosing the pot-shaped housing 3 at its front side, and two adjusting apparatus for a bowl-shaped reflector 1 mounted in an interior of the housing. The reflector 1 is pivotal about two axes 26 and 27 arranged at a right angle to one another by means of the two adjusting apparatus. Rotatable mechanisms, or knobs, 11, 24 of the two adjusting apparatus are arranged on the exterior of a top sidewall 25 of the pot-shaped housing 3 and can be manually manipulated, or manipulated with a tool. By means of the knob 11 the reflector 3 is pivoted about the vertical axis 26 via two angled transmission units, which respectively comprise a first and second miter gear mechanism 4, 12 and by means of the hand knob 24 it is pivoted about the horizontal axis 27 via an angled transmission unit which is not shown. The hand knobs 11 and 24 of both adjusting mechanisms lie close to one another and are arranged close to a front edge of the housing 3. Each of the first and second miter gear mechanisms 4, 12 respectively comprises a pair of beveled gears. The first and second miter gear mechanisms 4, 12, which are substantially separated, are coupled to one another by means of a rigid shaft 13 of resinous plastic. The resinous plastic used to manufacture the rigid shaft 13 cannot be brittle, but rather must have a small amount of elasticity. The shaft is provided along its entire length with cavities 28 and thereby has a large cross section for its necessary stiffness, but with a small mass, and it has, along its entire length, substantially the same wall strength. The shaft 13 extends horizontally along its length axis and is placed in a trough-like bearing box 9 formed on an interior side of a rearward housing wall 7 which is coextensive with the shaft 13. Each of the free ends of the shaft 13 respectively has a shaft toothed-gear formed thereon as one piece with the shaft. The shaft 13 has, centrally, on an outer surface thereof, a surrounding flange 18 which engages, with play (free or unimpeded motion), in a groove 19 of the trough-like bearing box 9. A first end portion of the trough-like bearing box 9, adjacent the first miter gear mechanism 4 is deeper than the rest of the bearing box 9. In this manner, the end portion of the shaft 13 having the shaft toothed-gear 8 of the first miter gear mechanism 4 is spaced a distance from the bearing box 9.

The second miter gear mechanism 12 has a resinous plastic rotation part, or pin, 29 on which are formed the hand knob 11 and a rotation-part toothed-gear 15 of the second miter gear mechanism. Between the hand knob 11 and the rotation-part toothed-gear 15, the rotation part 29 is rotatably mounted in an opening 10 in the top sidewall 25 of the housing. In this regard, the rotatable hand knob 11 lies at an exterior surface of an edge defining the opening 10 and a sealing ring placed in a surrounding ring groove of the rotation part 29 lies sealingly on an interior edge defining the opening 10. The interior edge defining the opening 10 extends into a bearing box 23 in the rearward housing wall 7, which, in turn, goes into the trough-like bearing box 9 at a right angle thereto. Both of the bearing boxes 9, 23 can be seen as bulges 17 on the rear side of the housing 3. A cover 16 is placed on the two toothed-gears 15, 14 of the second miter gear mechanism 12 from the interior side of the housing 3, which is fixed to the housing wall 7 by a screw and which has a side edge directed toward the rearward housing wall which engages, with play, in a ring groove of the rotation part 29 adjacent the toothed-gear 15. By means of this cover, the rotation part 29 is thereby held axially and the shaft at the shaft toothed-gear 14 is held radially.

The shaft toothed-gear 8 of the first miter gear mechanism 4, formed on the shaft 13, has teeth which interengage with teeth of the pin toothed-gear 5, whose rotation axis extends substantially at a right angle to the rotation axis of the shaft 13 and through which a threaded shaft, extending toward the reflector and defining a rotation axis of an adjusting pin 6, is shoved in press fit. The adjusting pin 6 extends from the exterior of the housing through an opening in the rearward housing wall 7 and has a head 20 which lies on an exterior side of the rearward housing wall 7 via an intermediate ring seal. The head 20 and a neck 21 formed on the toothed-gear 5 respectively engage in a shell-shaped shoulder 22 of the housing wall 7, with the shell-shaped shoulder 22, on the interior side of the housing wall 7, being open toward the shaft 13. The shaft 13, with the teeth of the shaft toothed-gear 8, exerts a bias on the teeth of the pin toothed-gear 5 and thereby presses the head 20 of the adjusting pin 6 against the ring seal (not shown) positioned between the head 20 and the housing wall 7. This is possible because the free end portion of the shaft 13 carrying the shaft toothed-gear 8 is spaced from the trough-like bearing box 9 and is thereby a free standing supporter for the shaft toothed-gear 8. To ensure that the force fit of the toothed-gear 5 on the adjusting pin 6 is sufficiently great, a cross knurling is placed on an outer surface of the adjusting pin, between its threaded shaft and its head. The threaded shaft 6 is screwed into a nut portion of a link 30, which, by means of a spherical head 31, self-guidingly engages in a link socket 32 of the reflector. Because the head 20 of the adjusting pin 6 lies on the exterior surface of the housing wall 7, it is possible to adjust the reflector with the head 20 of the adjusting pin 6 as well as with the rotatable knob 11.

The hand knob 24 of the adjusting apparatus with which the reflector 1 can be adjusted about the horizontally extending axis 27 is formed at a free end of a rigid shaft 33, whose length axis extends vertically. The shaft 33, adjacent its knob 24, is rotatably held in an opening of the housing 7 and has formed on its free end in the interior of the housing 3 a toothed-gear 34 of a third miter gear mechanism. The shaft 33 engages in a trough-shaped bearing box of the rearward housing wall in the interior of the headlight (not shown) which is substantially as long as the shaft 33.

Figure 5:
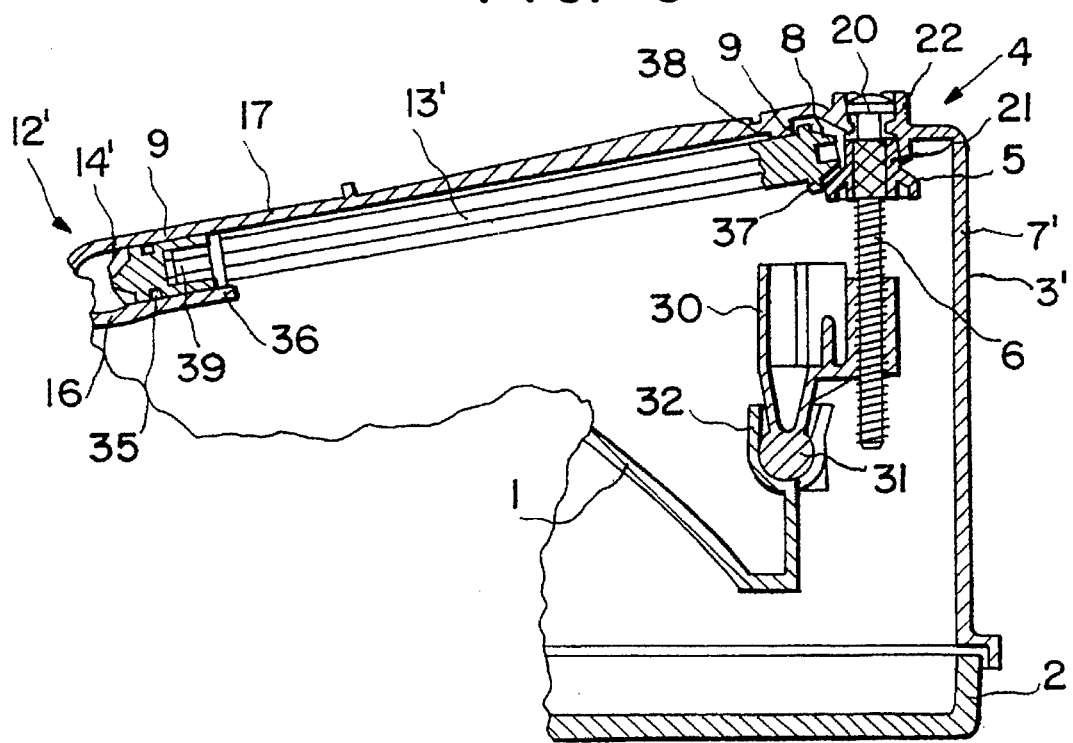
FIG. 5 is a cross-section also taken on line II—II in FIG. 1, through one of the angled transmission units (but in a second embodiment).

The adjusting apparatus shown in FIG. 5 differs from that shown in FIG. 2 as follows:

The shaft 13' is formed of two pieces, that is, the toothed-gear 8 of the first miter gear mechanism 4 is formed as one piece with the resinous plastic shaft 13' while a toothed-gear 14' of a second miter gear mechanism 12' is formed as a separate piece. The toothed-gear 14' is shoved onto a shaped end portion 39 of the shaft 13' with a receiving cavity of the toothed-gear 14' having a corresponding irregular shape to provide play. The shaft 13' is, together with both of the toothed-gears 8, 14', placed in a housing 3'. The shaft 13' has, between both toothed-gears 8, 14' a relatively smaller outer cross section and therefore only its free ends, along with the toothed-gears 8, 14' carried thereby, are in a bearing box 9' of the housing wall 7'. The end portion of the shaft 13' which is formed as one piece with the toothed-gear 8 of the first miter gear mechanism has, adjacent the toothed-gear 8, a surrounding shoulder 37 directed toward the second miter gear mechanism 12'. A positioning lug 38 formed at the interior side of the rearward housing wall 7' borders on the shoulder 37. A cover 16 which covers the two toothed-gears 14', 15 of the second miter gear mechanism 12' engages with a spring element 35 thereof in a groove of the axially movable shaft toothed-gear 14' as well as in a groove of the tooth gear 15. An outer edge portion 36 of the cover extends over the axially movable toothed-gear 14' and the outer edge portion 36 lies on an exterior surface of a surrounding flange of the shaft 13'. The shaft 13' has, between the toothed gears 8, 14' a star-shaped, or crossed-shaped, profile.

The mounting of both the first and second miter gear mechanisms is uncomplicated because, after the shaft, together with the toothed-gears mounted thereon, is laid in the bearing box of the housing wall, and after the remaining parts of the first and second miter gear mechanisms have been mounted, the rigid shaft and the shaft toothed-gears carried by the rigid shaft are held in the gearing box without the use of an additional part. The ends of the shaft with the shaft toothed-gears mounted thereon can be positioned directly, and/or indirectly via the shaft toothed-gears, at the bearing box of the rearward housing wall. The shaft is held in the bearing box against a lateral bending between the first and second miter gear mechanisms, also without an additional part, if the bearing box is formed to be trough-like and is made to be sufficiently deep. Only a small amount of room in the interior of the headlight is necessary in order to store the shaft for connecting the first and second miter gear mechanisms because the shaft extends directly along the rearward housing wall of the headlight.

Further, it is beneficial that the end portion of the shaft carrying the shaft toothed-gear of the first miter gear mechanism is directly held in the trough-shaped bearing box by the pin toothed-gear of the adjusting pin and that its other end portion is held therein by the cover covering the rotation-part toothed-gear of the second miter gear mechanism. In this manner, an uncomplicated and quick mounting of both of the first and second miter gear mechanisms is possible and its manufacture is therefore cost effective.

It is additionally beneficial for the shaft to be mounted in the trough-shaped bearing box along substantially its entire length and for the trough-shaped bearing box to form a bulge on the outer surface of the housing. In this manner, the shaft is held quite securely in the housing and is arranged to conserve space.

A further benefit is that between the shaft and the trough-shaped bearing box of the housing there is a groove-spring connection for axially affixing the shaft whereby the spring engages, with play, in the corresponding bearing box groove and is formed from a surrounding flange formed on the shaft, and being substantially arranged at half the length of the shaft. Because axial affixing of the shaft is provided exclusively by such a groove-spring connection, a small tolerance for the radial play of the shaft can be easily maintained. Because of the central arrangement of the groove-spring connection the spacing of the two shaft toothed-gears to the groove-spring connection is always the same.

It is a further benefit that the adjusting pin, which carries the pin toothed-gear of the first miter gear mechanism, is rotatably mounted in an opening of the housing with a head thereof lying on an outer edge of the housing wall forming the opening, with the pin toothed-gear being shoved, in press fit, on the shaft of the adjusting pin extending towards the reflector so that a side surface thereof lies against an interior edge of the housing wall forming the opening. In this manner, the pin toothed-gear and the adjusting pin attach themselves to the rearward housing wall. In this regard, it is further beneficial that the pin toothed-gear of the adjusting pin has a surrounding neck which lies against the rearward housing wall and that the neck of the pin toothed-gear as well as the head of the adjusting pin engage, with play, in a shell-shaped shoulder of the housing wall whereby the shell-shaped shoulder for the neck of the pin toothed-gear is open at its side facing the shaft. In this manner, the adjusting pin and the pin toothed-gear are stably held on the rearward housing wall.

Further, it is beneficial, that the trough-like bearing box is designed to be sufficiently long that the shaft, as well as the shaft toothed-gears which are formed as one piece with the shaft, can engage, or be received, therein. Further, it is practical that, in the rearward housing wall in which the bearing box for the shaft toothed-gear of the second miter gear mechanism is placed, there is a bearing box for the rotation-part toothed-gear of the second miter gear mechanism, which is positioned at an opening of the housing and which runs into the bearing box for the shaft toothed-gear to form an angle therewith. In this manner, the bearing of the shaft and the toothed-gears of the second miter gear mechanism is particularly reliable and its arrangement provides an economy of space.

In a particularly beneficial further embodiment of the invention an axis of the shaft extends horizontal and the axis of the rotation-part toothed-gear of the second miter gear mechanism, mounted in the opening of the housing, extends vertically whereby the rotation-part toothed-gear is mounted in a top sidewall of the housing and its rotation knob lies adjacent a rotation knob of another adjusting apparatus for the reflector. The two adjusting apparatus can be easily accessed from the top side of the headlight and only a small free space in the motor vehicle body is necessary for both of them together. The rotation devices, or knobs, can be manipulated by hand or with a tool.

An uncomplicated and cost-effectively-manufactured structure of an adjusting apparatus is provided by having at least one shaft toothed-gear manufactured as one piece with the shaft. If both of the shaft toothed-gears are not formed as one piece with the shaft, rather only one of the toothed-gears, it is quite beneficial for the separate toothed-gear to be carried by the free end portion of the rigid shaft so as to be axially movable. In this manner, the two shaft toothed-gears can also then be exactly positioned relative to their neighboring pin and rotation-part toothed-gears if the spacing between the two miter gear mechanisms has a rough tolerance.

The axially movable shaft toothed-gear is restrained in a radial direction, as well as an axial direction, in a bearing box of the housing wall by making it the shaft toothed-gear of the second miter gear mechanism and, in a beneficial manner, having a cover with a spring element engaging in a surrounding groove of the axially movable shaft toothed-gear for covering both toothed-gears of the second miter gear mechanism. In this connection, it is further beneficial that the cover of both toothed-gears respectively has a spring element which engages in a groove in both of the toothed gears.

If a large radial play comes about between the shaft toothed-gear movable in the axial direction and the rigid shaft it is further beneficial if the cover has a free edge portion which extends over the axially movable shaft toothed-gear to border on the outer surface of the shaft.

The shaft is easily rotatable if it extends between the shaft toothed-gears at a spacing from the interior surface of the rearward housing wall.

A shaft toothed-gear formed as one piece with the shaft of the first miter gear mechanism is exactly positioned relative to its neighboring pin toothed-gear of the first miter gear mechanism by including on the end portion of the shaft formed as one piece with the shaft toothed-gear a surrounding shoulder directed toward the second miter gear mechanism against which a positioning lug of the interior of the rearward housing wall borders. In this manner, not only is the shaft toothed-gear formed as one piece with the shaft axially retained by the housing wall, but the shaft itself is also axially retained. In this connection, it is particularly beneficial that the positioning lug forms a bearing box for the shaft having the shaft toothed-gears thereon.

The embodiments of the invention in which an exclusive property or privilege are claimed are defined as follows:

1. Adjusting apparatus for one or more headlight reflectors by means of which a reflector, which is enclosed in an interior of a housing by a light-transmissive shield, is pivotal about an axis, the adjusting apparatus comprising first and second angled transmission units coupled to one another in the interior of the housing, the first angled transmission unit including a first miter gear mechanism having a toothed-gear pair, with an adjusting pin toothed-gear thereof being coupled to, and rotatable with, an adjusting pin which couples the reflector with a rearward housing wall and with a shaft toothed-gear thereof, which is attached to a rigid shaft being set between the adjusting pin toothed-gear and a bearing box of the rearward housing wall, and the second angled transmission unit being rotatably mounted in an opening of the housing and having a rotatable knob manipulatable from an exterior of the housing;

wherein the second angled transmission unit, which is coupled to the first angled transmission unit by the rigid shaft, comprises a second miter gear mechanism including a shaft toothed-gear attached to the rigid shaft and a rotation-part toothed-gear attached to the rotatable knob; and wherein said rigid shaft is of rigid material having a first free end coupled to the shaft toothed-gear of the first miter gear mechanism for rotation therewith and a second free end coupled to, and rotatable with, the shaft toothed-gear of the second miter gear mechanism, said rigid shaft extending adjacent the rearward housing wall of the housing on the interior thereof, at least the ends of the shaft having the toothed-gears mounted thereon being in the bearing box of the rearward wall, the bearing box being trough-shaped with the shaft being held radially therein by girding elements for the pin and rotation-part toothed-gears whose teeth interengage with the shaft toothed-gears.

2. Adjusting apparatus as in claim 1 wherein a first end portion of the shaft having the shaft toothed-gear of the first miter gear mechanism thereon is radially held in the bearing box by a pin toothed-gear of the adjusting pin and the other end portion of the shaft is radially held in the bearing box by a cover for covering both the shaft toothed-gear and the rotation-part toothed-gear of the second miter gear mechanism.

3. Adjusting apparatus as in claim 2 wherein the bearing box has a trough-shape and the shaft is mounted in the trough-shaped bearing box along substantially its entire length.

4. Adjusting apparatus as in claim 1 wherein the bearing box forms a bulge on an outer surface of the housing.

5. Adjusting apparatus as in claim 1 wherein a groove-spring connection is formed between the shaft and the trough-like bearing box of the housing for axially retaining the shaft, said groove-spring connection comprising a spring attached to one of the shaft and bearing box which extends into a groove in the other of the shaft and bearing box with play.

6. Adjusting apparatus as in claim 5 wherein the spring is formed as a surrounding flange on the shaft which engages in a corresponding groove of the bearing box and is arranged at approximately half a length of the shaft.

7. Adjusting apparatus as in claim 1 wherein the adjusting pin, with the pin toothed-gear, of the first miter gear mechanism, is rotatably mounted in an opening of the housing and wherein said adjusting pin has a head which lies on an outer surface of the housing wall at the opening, with the pin toothed-gear being shoved in press fit onto a shaft of the adjusting pin extending toward the reflector to lie against an interior side surface of the housing wall at the opening.

8. Adjusting apparatus as in claim 7 wherein the end portion of the shaft having the shaft toothed-gear of the first miter gear mechanism extends along the rearward housing wall at a spaced distance, with the shaft toothed-gear of the first miter gear mechanism being biased against the pin toothed-gear of the adjusting pin and there being thereby a ring seal below the head of the adjusting pin pressed against the housing wall.

9. Adjusting apparatus as in claim 7 wherein the pin toothed-gear of the adjusting pin has a surrounding neck lying on an interior surface of the housing wall and wherein the neck of the pin toothed-gear as well as the head of the adjusting pin engage, with play, into shell-shaped shoulders of the housing wall, whereby the shell-shaped shoulder for the neck of the pin toothed-gear is open toward the shaft.

10. Adjusting apparatus as in claim 1 wherein the trough-like bearing box is sufficiently long that it receives both the shaft as well as the shaft toothed-gears on the shaft.

11. Adjusting apparatus as in claim 1 wherein the rearward housing wall in which the bearing box for the toothed-gear of the second miter gear mechanism is formed also has formed therein a bearing box for the rotation part toothed-gear of the second miter gear mechanism mounted at an opening of the housing which runs into the bearing box for the shaft toothed-gear and together with the bearing box of the shaft toothed-gear forms an angle.

12. Adjusting apparatus as in claim 1 wherein an axis of the shaft extends horizontally and an axis of the rotation-part toothed-gear mounted in the opening of the housing extends vertically whereby the rotation-part toothed-gear is mounted in an opening of a sidewall of the housing and whereby said rotation-part toothed-gear has a rotation knob thereon which is near a rotation knob for another adjusting apparatus for the reflector.

13. Adjusting apparatus as in claim 1 wherein at least one of the shaft toothed-gears which is rotatable with the shaft is manufactured as one piece with the shaft.

14. Adjusting apparatus as in claim 13 wherein the shaft toothed-gear formed as one piece with the shaft as part of the first miter gear mechanism has a surrounding shoulder facing the second miter gear mechanism against which a positioning lug of the interior side of the rearward housing wall lies.

15. Adjusting apparatus as in claim 14 wherein the positioning lug forms a bearing box for the shaft carrying the shaft toothed-gears.

16. Adjusting apparatus as in claim 1 wherein one of the shaft toothed-gears is not constructed as one piece with the shaft but is supported by a free end portion of the rigid shaft to be axially movable.

17. Adjusting apparatus as in claim 16 wherein the axially-movable shaft toothed-gear is part of the second miter gear mechanism and wherein the axially-movable toothed-gear has a surrounding groove therein in which spring elements of a cover covering both the shaft and rotation-part toothed-gears of the second miter gear mechanism engage.

18. Adjusting apparatus as in claim 17 wherein the cover has a free edge portion which extends over the axially-moveable shaft toothed-gear and extends to border on an outer surface of the shaft.

19. Adjusting apparatus as in claim 16 wherein the free end portion of the rigid shaft has a non-circular profile and the axially movable toothed-gear has a correspondingly shaped cavity for receiving the free end portion of the shaft.

20. Adjusting apparatus as in claim 1 wherein the shaft, between the shaft toothed gears, extends along the interior surface of the rearward housing wall, but is spaced therefrom.

* * * * *